(12) United States Patent
Amidon et al.

(10) Patent No.: US 7,801,971 B1
(45) Date of Patent: Sep. 21, 2010

(54) SYSTEMS AND METHODS FOR DISCOVERING, CREATING, USING, AND MANAGING SOCIAL NETWORK CIRCUITS

(75) Inventors: Christopher Amidon, Apex, NC (US); Alfredo Issa, Apex, NC (US); Richard Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 634 days.

(21) Appl. No.: 11/526,955

(22) Filed: Sep. 26, 2006

(51) Int. Cl.
*G06F 15/06* (2006.01)
(52) U.S. Cl. .............................. 709/217; 726/3; 709/200
(58) Field of Classification Search .................. 709/217
See application file for complete search history.

(56) References Cited

U.S. PATENT DOCUMENTS

| | | |
|---|---|---|
| 5,220,657 A | 6/1993 | Bly et al. |
| 5,517,617 A | 5/1996 | Sathaye et al. |
| 5,629,980 A | 5/1997 | Stefik et al. |
| 5,717,923 A | 2/1998 | Dedrick |
| 5,749,081 A | 5/1998 | Whiteis |
| 5,754,939 A | 5/1998 | Herz et al. |
| 5,867,799 A | 2/1999 | Lang et al. |
| 5,884,035 A | 3/1999 | Butman et al. |
| 5,948,040 A | 9/1999 | DeLorme et al. |
| 5,983,214 A | 11/1999 | Lang et al. |
| 6,073,119 A | 6/2000 | Bornemisza-Wahr et al. |
| 6,073,138 A | 6/2000 | de l'Etraz et al. |
| 6,088,702 A | 7/2000 | Plantz et al. |
| 6,092,049 A | 7/2000 | Chislenko et al. |
| 6,149,441 A | 11/2000 | Pellegrino et al. |
| 6,151,624 A | 11/2000 | Teare et al. |
| 6,195,696 B1 | 2/2001 | Baber et al. |
| 6,260,069 B1 | 7/2001 | Anglin |

(Continued)

FOREIGN PATENT DOCUMENTS

EP 1177056 A2 1/2001

(Continued)

OTHER PUBLICATIONS

No Author, "pidgin," (website), obtained Jul. 13, 2007, 1 page, http://pidgin.im/.

(Continued)

*Primary Examiner*—Wing F Chan
*Assistant Examiner*—Andrew Woo
(74) *Attorney, Agent, or Firm*—Withrow & Terranova, PLLC

(57) ABSTRACT

A social network circuit includes two or more members of a social network in live communication with one another. Systems and methods of administering social network circuits include computing devices configured to determine the existence and extent of social network circuits. Client applications associated with computing devices used by each member may be configured to provide one or more servers with session data indicating the existence of live communication links. Based on the session data, the server(s) may track one or more social network circuits. Data representing the circuits may be provided to the clients in the circuits. Clients may selectively participate in social network circuits based on user- and system-provided parameters. For example, a subset of social network users in active communication may be further divided into a particular social network circuit devoted to a particular topic of discussion. Users may participate in multiple social network circuits at any given time.

12 Claims, 4 Drawing Sheets

U.S. PATENT DOCUMENTS

| | | |
|---|---|---|
| 6,275,819 B1 | 8/2001 | Carter |
| 6,308,175 B1 | 10/2001 | Lang et al. |
| 6,311,194 B1 | 10/2001 | Sheth et al. |
| 6,314,409 B2 | 11/2001 | Schneck et al. |
| 6,327,590 B1 | 12/2001 | Chidlovskii et al. |
| 6,338,086 B1 | 1/2002 | Curtis et al. |
| 6,374,290 B1 | 4/2002 | Scharber et al. |
| 6,385,619 B1 | 5/2002 | Eichstaedt et al. |
| 6,389,409 B1 | 5/2002 | Horovitz et al. |
| 6,389,541 B1 | 5/2002 | Patterson |
| 6,421,439 B1 | 7/2002 | Liffick |
| 6,438,579 B1 | 8/2002 | Hosken |
| 6,442,693 B1 | 8/2002 | Sandgren et al. |
| 6,463,433 B1 | 10/2002 | Baclawski |
| 6,480,885 B1 | 11/2002 | Olivier |
| 6,493,703 B1 | 12/2002 | Knight et al. |
| 6,498,795 B1 | 12/2002 | Zhang et al. |
| 6,519,629 B2 | 2/2003 | Harvey et al. |
| 6,525,747 B1 | 2/2003 | Bezos |
| 6,526,411 B1 | 2/2003 | Ward |
| 6,539,375 B2 | 3/2003 | Kawasaki |
| 6,553,108 B1 | 4/2003 | Felger |
| 6,553,367 B2 | 4/2003 | Horovitz et al. |
| 6,560,578 B2 | 5/2003 | Eldering |
| 6,567,122 B1 | 5/2003 | Anderson et al. |
| 6,581,072 B1 | 6/2003 | Mathur et al. |
| 6,594,693 B1 | 7/2003 | Borwankar |
| 6,606,644 B1 | 8/2003 | Ford et al. |
| 6,629,100 B2 | 9/2003 | Morris et al. |
| 6,630,944 B1 | 10/2003 | Kakuta et al. |
| 6,631,098 B2 | 10/2003 | Chang et al. |
| 6,651,086 B1 | 11/2003 | Manber et al. |
| 6,654,735 B1 | 11/2003 | Eichstaedt et al. |
| 6,687,732 B1 | 2/2004 | Bector et al. |
| 6,701,362 B1 | 3/2004 | Subramonian et al. |
| 6,745,178 B1 | 6/2004 | Emens et al. |
| 6,748,420 B1 | 6/2004 | Quatrano et al. |
| 6,757,517 B2 | 6/2004 | Chang |
| 6,772,160 B2 | 8/2004 | Cho et al. |
| 6,785,704 B1 | 8/2004 | McCanne |
| 6,816,906 B1 | 11/2004 | Icken et al. |
| 6,832,245 B1 | 12/2004 | Isaacs et al. |
| 6,839,680 B1 | 1/2005 | Liu et al. |
| 6,859,807 B1 | 2/2005 | Knight et al. |
| 6,917,944 B1 | 7/2005 | Prasad et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,970,840 B1 | 11/2005 | Yu et al. |
| 6,980,993 B2 | 12/2005 | Horvitz et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev et al. |
| 7,024,391 B2 | 4/2006 | Burich |
| 7,039,639 B2 | 5/2006 | Brezin et al. |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,054,900 B1 | 5/2006 | Goldston |
| 7,058,606 B2 | 6/2006 | Stefik et al. |
| 7,058,897 B2 | 6/2006 | Matsuda |
| 7,069,308 B2 | 6/2006 | Abrams |
| 7,103,634 B1 | 9/2006 | Ullmann et al. |
| 7,107,317 B2 | 9/2006 | Demsky et al. |
| 7,117,254 B2 | 10/2006 | Lunt et al. |
| 7,120,681 B2 | 10/2006 | Frelechoux et al. |
| 7,124,164 B1 | 10/2006 | Chemtob |
| 7,142,856 B2 | 11/2006 | Barrow |
| 7,150,030 B1 | 12/2006 | Eldering et al. |
| 7,188,140 B1 | 3/2007 | Greenspan et al. |
| RE39,717 E | 7/2007 | Yates et al. |
| 7,302,429 B1 | 11/2007 | Wanker |
| 7,328,242 B1 | 2/2008 | McCarthy et al. |
| 7,359,894 B1 | 4/2008 | Liebman et al. |
| 7,370,015 B2 | 5/2008 | Gvily |
| 2001/0007099 A1 | 7/2001 | Rau et al. |
| 2001/0042043 A1 | 11/2001 | Shear et al. |
| 2002/0032634 A1 | 3/2002 | Abrams et al. |
| 2002/0032905 A1 | 3/2002 | Sherr et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0078206 A1 | 6/2002 | Boies et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0124053 A1 | 9/2002 | Adams et al. |
| 2002/0138744 A1 | 9/2002 | Schleicher et al. |
| 2002/0152322 A1 | 10/2002 | Hay |
| 2002/0156875 A1 | 10/2002 | Pabla |
| 2002/0156893 A1 | 10/2002 | Pouyoul et al. |
| 2002/0156917 A1 | 10/2002 | Nye |
| 2002/0169737 A1 | 11/2002 | Armstrong et al. |
| 2002/0178164 A1 | 11/2002 | Wisniewski |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028596 A1 | 2/2003 | Toyota et al. |
| 2003/0028639 A1 | 2/2003 | Yamamoto et al. |
| 2003/0046587 A1 | 3/2003 | Bheemarasetti et al. |
| 2003/0050976 A1 | 3/2003 | Block et al. |
| 2003/0050977 A1 | 3/2003 | Puthenkulam et al. |
| 2003/0061282 A1 | 3/2003 | Ebata et al. |
| 2003/0061287 A1 | 3/2003 | Yu et al. |
| 2003/0078858 A1 | 4/2003 | Angelopoulos et al. |
| 2003/0079120 A1 | 4/2003 | Hearn et al. |
| 2003/0084162 A1 | 5/2003 | Johnson et al. |
| 2003/0093520 A1 | 5/2003 | Beesley |
| 2003/0101449 A1 | 5/2003 | Bentolila et al. |
| 2003/0105812 A1 | 6/2003 | Flowers, Jr. et al. |
| 2003/0112823 A1 | 6/2003 | Collins et al. |
| 2003/0120662 A1 | 6/2003 | Vishik |
| 2003/0120680 A1 | 6/2003 | Agrawal et al. |
| 2003/0120928 A1 | 6/2003 | Cato et al. |
| 2003/0135576 A1 | 7/2003 | Bodin |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0179228 A1 | 9/2003 | Schreiber et al. |
| 2003/0191814 A1 | 10/2003 | Tran |
| 2003/0195851 A1 | 10/2003 | Ong |
| 2003/0195924 A1 | 10/2003 | Franke et al. |
| 2003/0200190 A1 | 10/2003 | Adar et al. |
| 2003/0204605 A1 | 10/2003 | Hudson et al. |
| 2003/0220975 A1 | 11/2003 | Malik |
| 2003/0220980 A1 | 11/2003 | Crane |
| 2003/0234859 A1 | 12/2003 | Malzbender et al. |
| 2004/0003090 A1 | 1/2004 | Deeds |
| 2004/0015553 A1 | 1/2004 | Griffin et al. |
| 2004/0019846 A1 | 1/2004 | Castellani et al. |
| 2004/0024720 A1 | 2/2004 | Fairweather |
| 2004/0024892 A1 | 2/2004 | Creswell et al. |
| 2004/0031058 A1 | 2/2004 | Reisman |
| 2004/0032393 A1 | 2/2004 | Brandenberg et al. |
| 2004/0039913 A1 | 2/2004 | Kruse |
| 2004/0044727 A1 | 3/2004 | Abdelaziz et al. |
| 2004/0044774 A1 | 3/2004 | Mangalik et al. |
| 2004/0054723 A1 | 3/2004 | Dayal et al. |

| | | |
|---|---|---|
| 2004/0059705 A1 | 3/2004 | Wittke |
| 2004/0064416 A1 | 4/2004 | Peled et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0122958 A1 | 6/2004 | Wardrop |
| 2004/0137882 A1 | 7/2004 | Forsyth |
| 2004/0148275 A1 | 7/2004 | Achlioptas |
| 2004/0148434 A1 | 7/2004 | Matsubara et al. |
| 2004/0148503 A1 | 7/2004 | Sidman |
| 2004/0148523 A1 | 7/2004 | Lambert |
| 2004/0162871 A1 | 8/2004 | Pabla et al. |
| 2004/0181487 A1 | 9/2004 | Hanson |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220893 A1 | 11/2004 | Spivazk et al. |
| 2004/0237045 A1 | 11/2004 | Meltzer |
| 2004/0249768 A1 | 12/2004 | Kontio et al. |
| 2004/0260968 A1 | 12/2004 | Edwards et al. |
| 2004/0267625 A1 | 12/2004 | Feng et al. |
| 2005/0015357 A1 | 1/2005 | Shahidi |
| 2005/0021096 A1 | 1/2005 | Mower |
| 2005/0021398 A1 | 1/2005 | McCleskey et al. |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0047573 A1 | 3/2005 | Cameron et al. |
| 2005/0076365 A1 | 4/2005 | Popov et al. |
| 2005/0091289 A1 | 4/2005 | Shappell et al. |
| 2005/0091316 A1 | 4/2005 | Ponce et al. |
| 2005/0094313 A1 | 5/2005 | Kim |
| 2005/0097170 A1 | 5/2005 | Zhu et al. |
| 2005/0114672 A1 | 5/2005 | Duncan et al. |
| 2005/0114783 A1 | 5/2005 | Szeto |
| 2005/0131762 A1 | 6/2005 | Bharat et al. |
| 2005/0138430 A1 | 6/2005 | Landsman |
| 2005/0149621 A1 | 7/2005 | Kirkland et al. |
| 2005/0154701 A1 | 7/2005 | Parunak et al. |
| 2005/0159970 A1 | 7/2005 | Buyukkokten et al. |
| 2005/0159998 A1 | 7/2005 | Buyukkokten et al. |
| 2005/0163135 A1 | 7/2005 | Hopkins |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1* | 8/2005 | Bourne ................ 709/200 |
| 2005/0195978 A1 | 9/2005 | Babic et al. |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198290 A1 | 9/2005 | Berkey et al. |
| 2005/0198305 A1 | 9/2005 | Pezaris et al. |
| 2005/0201290 A1 | 9/2005 | Vasudev et al. |
| 2005/0203801 A1* | 9/2005 | Morgenstern et al. ......... 705/14 |
| 2005/0203892 A1 | 9/2005 | Wesley et al. |
| 2005/0204038 A1 | 9/2005 | Medvinsky et al. |
| 2005/0207545 A1 | 9/2005 | Gao et al. |
| 2005/0209999 A1 | 9/2005 | Jou |
| 2005/0210104 A1 | 9/2005 | Torvinen |
| 2005/0210387 A1 | 9/2005 | Alagappan et al. |
| 2005/0210409 A1 | 9/2005 | Jou |
| 2005/0215660 A1 | 9/2005 | Tomikawa et al. |
| 2005/0216300 A1 | 9/2005 | Appelman et al. |
| 2005/0216550 A1 | 9/2005 | Paseman et al. |
| 2005/0226511 A1 | 10/2005 | Short |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0235062 A1 | 10/2005 | Lunt et al. |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0251675 A1 | 11/2005 | Marcjan et al. |
| 2005/0256866 A1 | 11/2005 | Lu et al. |
| 2005/0256909 A1 | 11/2005 | Aboulhosn et al. |
| 2005/0262162 A1 | 11/2005 | Levy |
| 2005/0262199 A1 | 11/2005 | Chen et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0268329 A1* | 12/2005 | Lee et al. ................ 726/3 |
| 2005/0283497 A1 | 12/2005 | Nurminen et al. |
| 2005/0289648 A1 | 12/2005 | Grobman et al. |
| 2006/0004703 A1 | 1/2006 | Spivack et al. |
| 2006/0004789 A1 | 1/2006 | Lunt et al. |
| 2006/0004892 A1 | 1/2006 | Lunt et al. |
| 2006/0010225 A1 | 1/2006 | Issa |
| 2006/0015588 A1 | 1/2006 | Achlioptas et al. |
| 2006/0020960 A1 | 1/2006 | Relan et al. |
| 2006/0021009 A1 | 1/2006 | Lunt |
| 2006/0026235 A1 | 2/2006 | Schwarz et al. |
| 2006/0031489 A1 | 2/2006 | Marcjan |
| 2006/0031770 A1 | 2/2006 | McMenamin |
| 2006/0035766 A1 | 2/2006 | Towley, III et al. |
| 2006/0036641 A1 | 2/2006 | Brydon et al. |
| 2006/0036766 A1 | 2/2006 | Baupin |
| 2006/0042483 A1 | 3/2006 | Work et al. |
| 2006/0047839 A1 | 3/2006 | Tate et al. |
| 2006/0048059 A1 | 3/2006 | Etkin |
| 2006/0048132 A1 | 3/2006 | Chen et al. |
| 2006/0053380 A1 | 3/2006 | Spataro et al. |
| 2006/0058025 A1 | 3/2006 | Barrow |
| 2006/0059571 A1 | 3/2006 | Chen et al. |
| 2006/0063552 A1 | 3/2006 | Tillet et al. |
| 2006/0064431 A1 | 3/2006 | Kishore et al. |
| 2006/0074863 A1 | 4/2006 | Kishore et al. |
| 2006/0079260 A1 | 4/2006 | Tillet et al. |
| 2006/0080432 A1 | 4/2006 | Spataro et al. |
| 2006/0085248 A1 | 4/2006 | Arnett et al. |
| 2006/0085818 A1 | 4/2006 | Bodlaender et al. |
| 2006/0089913 A1 | 4/2006 | Jaipuria et al. |
| 2006/0090137 A1 | 4/2006 | Cheng et al. |
| 2006/0095471 A1 | 5/2006 | Krikorian et al. |
| 2006/0095514 A1 | 5/2006 | Wang et al. |
| 2006/0095792 A1 | 5/2006 | Hurtado et al. |
| 2006/0095976 A1 | 5/2006 | Torres et al. |
| 2006/0107286 A1 | 5/2006 | Connor et al. |
| 2006/0112111 A1 | 5/2006 | Tseng et al. |
| 2006/0117090 A1 | 6/2006 | Schellingerhout et al. |
| 2006/0117378 A1 | 6/2006 | Tam et al. |
| 2006/0121987 A1* | 6/2006 | Bortnik et al. ................ 463/42 |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0136551 A1 | 6/2006 | Amidon et al. |
| 2006/0143067 A1 | 6/2006 | Calabria |
| 2006/0143068 A1 | 6/2006 | Calabria |
| 2006/0143084 A1 | 6/2006 | Donnelli et al. |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |

| | | | |
|---|---|---|---|
| 2006/0161553 A1 | 7/2006 | Woo | |
| 2006/0167804 A1 | 7/2006 | Aydar et al. | |
| 2006/0167855 A1 | 7/2006 | Ishikawa et al. | |
| 2006/0173838 A1 | 8/2006 | Garg et al. | |
| 2006/0173957 A1 | 8/2006 | Robinson et al. | |
| 2006/0173963 A1 | 8/2006 | Roseway et al. | |
| 2006/0173985 A1 | 8/2006 | Moore | |
| 2006/0184464 A1* | 8/2006 | Tseng et al. | 706/14 |
| 2006/0184997 A1 | 8/2006 | La Rotonda et al. | |
| 2006/0190524 A1 | 8/2006 | Bethke et al. | |
| 2006/0190536 A1 | 8/2006 | Strong et al. | |
| 2006/0195441 A1 | 8/2006 | Julia et al. | |
| 2006/0195462 A1 | 8/2006 | Rogers | |
| 2006/0200434 A1 | 9/2006 | Flinn et al. | |
| 2006/0200435 A1 | 9/2006 | Flinn et al. | |
| 2006/0209727 A1 | 9/2006 | Jennings, III et al. | |
| 2006/0209797 A1 | 9/2006 | Anisimov et al. | |
| 2006/0218153 A1 | 9/2006 | Voon et al. | |
| 2006/0218225 A1* | 9/2006 | Hee Voon et al. | 709/201 |
| 2006/0218286 A1 | 9/2006 | Brombal et al. | |
| 2006/0218577 A1 | 9/2006 | Goodman et al. | |
| 2006/0242581 A1 | 10/2006 | Manion et al. | |
| 2006/0248122 A1 | 11/2006 | Nikiel et al. | |
| 2006/0248573 A1 | 11/2006 | Pannu et al. | |
| 2006/0259957 A1 | 11/2006 | Tam et al. | |
| 2006/0259982 A1* | 11/2006 | Upendran | 726/27 |
| 2006/0267940 A1 | 11/2006 | Groom et al. | |
| 2007/0049335 A1 | 3/2007 | Haitani et al. | |
| 2007/0061487 A1 | 3/2007 | Moore et al. | |
| 2007/0143228 A1 | 6/2007 | Jorden et al. | |
| 2007/0150603 A1 | 6/2007 | Crull et al. | |
| 2007/0173325 A1* | 7/2007 | Shaw et al. | 463/42 |
| 2007/0192299 A1 | 8/2007 | Zuckerberg et al. | |
| 2007/0198506 A1 | 8/2007 | Attaran Rezael et al. | |
| 2007/0198648 A1 | 8/2007 | Allen et al. | |
| 2007/0203828 A1 | 8/2007 | Jung et al. | |
| 2007/0233828 A1 | 10/2007 | Gilbert | |
| 2007/0250641 A1 | 10/2007 | Flannery et al. | |
| 2007/0255785 A1 | 11/2007 | Hayashi et al. | |
| 2007/0266097 A1 | 11/2007 | Harik et al. | |
| 2007/0282887 A1 | 12/2007 | Fischer et al. | |
| 2008/0019353 A1 | 1/2008 | Foote | |
| 2008/0046976 A1 | 2/2008 | Zuckerberg | |
| 2008/0065471 A1 | 3/2008 | Reynolds et al. | |
| 2008/0088698 A1 | 4/2008 | Patel et al. | |

FOREIGN PATENT DOCUMENTS

| | | |
|---|---|---|
| EP | 1 338 966 A3 | 8/2005 |
| EP | 1675060 A1 | 10/2005 |
| WO | WO 2005/111760 A1 | 11/2005 |
| WO | WO2006036165 A2 | 4/2006 |
| WO | WO2006041425 A2 | 4/2006 |
| WO | WO2007070676 A2 | 6/2007 |

OTHER PUBLICATIONS

No Author, "Dijkstra's algorithm," (website), obtained Apr. 10, 2008, 4 pages, http://en.wikipedia.org/wiki/Dijkstra's_algorithm.
No Author, "Centrality—Wikipedia," (website), 3 pages, obtained Sep. 19, 2007, http://en.wikipedia.org/wiki/Centrality.
No Author, "Centrality—Wikipedia," (website), 3 pages, obtained Sep. 19, 2007, http://en.wikipedia.org/wiki/Eigenvector_Centrality.
No Author, "News—Gaim 1.5.0," (website), obtained Sep. 6, 2007, 3 pages, http://www.gaim.sourceforge.net.
No Author, "Huminity—Social Networking," (website), obtained Feb. 8, 2007, 1 page, http://www.huminity.com/english/software.html.
M.E.J. Newman, "The Mathematics of networks," (chapter), 12 pages, 2008, in The New Palgrave Encyclopedia of Economics, 2nd edition, L. E. Blume and S. N. Durlauf (eds.), Palgrave Macmillan, Basingstoke, http://www-personal.umich.edu/~mejn/papers/palgrave.pdf.
Web page from The Friend of a Friend (FOAF) Project. http://www.huminity.com/english/software.html (3 pages).
http://gaim.sourceforge.net/ (3 pages).
Architecture of Windows Media Rights Manager, www.microsoft.com/windows/windowsmedia/howto/articles/drmarchitecture.aspx.
FOAF Vocabulary Specification, http://xmlns.com/foaf/0.1/.
Deborah L. McGuinness et al., editors; "OWL Web Ontology Language—Overview", copyright 2004 World Wide Web Consortium (W3C), published Feb. 10, 2004, http://www.w3.org/TR/2004/REC-owl-features-20040210/, 19 pages.
Pretschner, Alexander et al., "Ontology Based Personalized Search," Proceedings of the 11th IEEE International Conference on Tools with Artificial Intelligence, p. 391, Nov. 8-10, 1999.
Warren Sack, "Discourse Diagrams: Interface Design for Very Large-Scale Conversations," System Sciences, Proceedings of the 33rd Annual Hawaii International Conference, 2000.
Marc A. Smith and Andrew T. Fiore, "Visualization Components for Persistent Conversations," Sep. 2000.
Srinivasan, T. et al., "OPSHNN: Ontology Based Personalized Searching Using Hierarchical Neural Networks Evidence Combination," The Sixth IEEE International Conference on Computer and Information Technology 2006, p. 44-44, Sep. 2006.
The Case for a Hybrid P2P Search Infrastructure, http://www.cs.berkeley.edu/~boonloo/research/pier/casehybrid_iptps.ppt.
ICQ, http://www.icq.com/.
Beverly Yang et al., "Designing a Super-Peer Network," 19th International Conference on Data Engineering (ICDE'03), 2003.
Home page for www.myspace.com (accessed Jul. 13, 2007)—1 page.
Home page for www.facebook.com (accessed Jul. 13, 2007)—1 page.
Homepage for www.friendster.com (accessed Jul. 13, 2007)—1 page.
http://pidgin.im/pidgin/home (redirected from http://gaim.sourceforge.net) (accessed Jul. 13, 2007)—1 page.
http://en.wikipedia.org/wiki/Dijkstra%27s_algorithm (accessed Sep. 5, 2007)—3 pages.
Amidon et al., U.S. Appl. No. 11/607,775, filed Dec. 1, 2006, "Systems and Methods for Subdividing and Securing Social Network Circuits".
Amidon et al., U.S. Appl. No. 11/638,027, filed Dec. 13, 2006, "Systems and Methods for Social Network Based Conferencing".
Issa et al., U.S. Appl. No. 11/639,104, filed Dec. 14, 2006, "System and Method of Sharing Content Among Multiple Social Network Nodes Using an Aggregation Node".

* cited by examiner

SYSTEMS AND METHODS FOR DISCOVERING, CREATING, USING, AND MANAGING SOCIAL NETWORK CIRCUITS

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and blogs and other web sites. For example, instant messaging systems such as Internet Relay Chat (IRC), ICQ, AOL Instant Messenger, Yahoo! Messenger, and Microsoft's MSN Messenger are widely used by many users on the Internet. Similar systems are available for messaging within local networks, as well.

Various arrangements of the previously-listed (and other) communication systems have been proposed for use in so-called "social networking" systems. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, http://www.myspace.com and http://www.friendster.com. Users of such sites can post messages and other content to web pages accessible to various parties of their choosing (for example, to "friends only" or to the public at large). Social networking sites may also utilize instant messaging and online chat rooms that allow for near-instantaneous communication between users.

Recent developments in the field of social networking and online communication have been directed towards providing tools for users to create, manage, and explore social networks. For instance, mapping of social networks has been proposed based on correlating contact lists. A user can then explore various social networks of which the user is a part by using the resulting map, diagram, or other representation. For example, a user may use social networking tools to discover that friends of one or more of the user's friends (heretofore unknown to the user) may share common interests. The user may then pursue a closer relationship with the newly found friends-of-a-friend, for example, by discussing topics and sharing content of common interest with both the user's newly-found and original friends. As a further example, tools such as Huminity (http://www.huminity.com) may "traverse" a social network based on buddy or contact lists and provide a representation of the social network.

Social networking sites (and other tools) may provide some indication of changes in social networks over time. For example, as noted above, a social networking site may provide a representation such as a diagram or list of a user's friends, colleagues and other social network members. The social networking site may even update the diagram or list frequently. For instance, the social networking site or system may nearly-instantaneously update the user's social network when the user sends a message to a new friend or contact or when the user deletes a friend or contact.

Many social networking sites and other tools may provide an indicator as to whether a user is online or otherwise available. For example, instant messaging applications frequently provide "buddy lists" that indicate whether a contact is online, online-but-idle, or offline. Some instant messaging applications further indicate when a contact is preparing a message. For example, the open-source messaging application Gaim (http://gaim.sourceforge.net) provides an indicator in a user's instant message window when the other party to the messaging session is typing a message.

Generally speaking, tools that allow users to analyze and explore social networks have been time-limited in that most display static representations of the social network without providing data on the extent to which the social network is "live" or active. Thus, it is difficult for a user to determine whether or how the members of the user's social network are interacting in real time. While various presently-existing systems provide indicators of online status or activity, such systems may not necessarily provide information to the user about the existence and extent of such activity across the social network.

For example, a user may wish to discuss a particular topic with friends or other contacts within his social network. Present systems, such as those including chat rooms for example, allow for collaborative, topic-based discussions. However, to participate in such a discussion, the user needs to seek out a particular chat room and ascertain whether desired contacts are in the chat room. Alternatively, the user may create a chat room regarding the desired topic, but then must locate and invite desired users and screen out undesired users and otherwise assemble the chat room or discussion group.

As a further example, if a user wishes to share content with persons in a social network, the user must first determine if such persons are online and wish to view the content, which takes time and can become burdensome. For example, if a user wants to immediately share a new video, sending an email or other invitation ensures a delayed sharing experience, while initiating multiple instant messaging sessions quickly becomes tedious. Furthermore, depending upon the make up of a particular social network, the user may be unaware of whom to invite. For instance, the user's social network may include close friends and a far-flung network of co-workers. Although the user may be aware of friends that are interested in the new video, the user may not be aware that a co-worker would also enjoy viewing the video unless the user undertakes a certain amount of investigation. Even with presently-existing social networking tools that could reveal the co-worker's preferences, such investigation may entail too large a delay for the user to undertake, thus depriving the user of the fullest social networking online experience.

Therefore, a need exists for a system that allows users to discover, create, and manage active communications within and throughout social networks.

SUMMARY OF THE INVENTION

Objects and advantages of the present invention will be apparent to one of skill in the art upon careful review of the disclosure. Such objects and advantages include providing systems and methods for users to discover, create, explore and manage active communications in one or more social networks.

As used herein, a social network circuit comprises at least some members of a social network. However each member in a social network circuit is connected to at least one other member in the circuit by way of a live communication link. For example, a live communication link may comprise an ongoing instant messaging conversation between two or more parties. In other embodiments, a live communications link may comprise a file sharing session, an email conversation, blog postings and comments, video and/or audio chat sessions, or other video, textual, and/or audio connections, including telephone connections. Communication links may be achieved in any suitable fashion, including by wired and/or wireless links.

As will be discussed in further detail herein, a communication link can be characterized as "live" when it is in actual use, but also (optionally) for a predetermined time period immediately following use. Furthermore, a communication link may be declared as "live" at one or more predetermined times, either automatically or in response to user scheduling data.

The remainder of this disclosure uses the terms "potential social network circuit" and "active social network circuit." "Potential" circuits comprise any social network circuit that meets the basic criteria of a social network circuit (i.e. each member in the circuit is connected to at least one other member by way of a live communication link). Depending upon various criteria that will be discussed in further detail below, certain members of a "potential" social network circuit may be included in or excluded from certain circuits derived from the potential social network circuit. Therefore, for purposes of clarity, the term "active" social network circuit is used to denote a social network circuit comprising at least some members of a potential social network circuit who meet one or more parameters or criteria.

One of skill in the art will recognize that, while an active social network circuit may comprise a subset of a potential social network circuit, it is entirely feasible for all members of a potential social network circuit to be members of an active social network circuit. Furthermore, it will be apparent that a single potential social network circuit may give rise to a plurality of active social network circuits depending upon what parameters are used.

This disclosure refers generally to "users" participating in and receiving information regarding social network circuits. The term "user" is meant to broadly include not only an individual, but also other entities, such as groups of individuals and organizations when treatable as a single unit.

A method of administrating one or more social network circuits can include receiving session information from at least one client included within a social network. The session information can include data identifying at least one communication link between the client and at least one other client in the social network. The method further includes tracking, based on data including the session information, at least one potential social network circuit comprising a plurality of clients, wherein each client in the potential social network circuit is connected to at least one other client in the circuit by a live communication link. Tracking may include storing, in computer-readable form, data defining the at least one social network circuit.

For example, a social network may include a first, second, third, and fourth client. Session information may be received from the first client, indicating a connection between the first and third clients; from the second client, indicating a communication link between the second and fourth client; and from the third client, indicating a communication link between the second client and the third client. The social network circuit can include all of the first, second, third, and fourth clients.

The method may further include providing information identifying the at least one potential social network circuit to one or more of the clients included in the potential social network circuit. As noted above, a communication link may be identified as live at the time a communication occurs between at least two clients. The link may be additionally identified as live for a predetermined time after a communication occurs between the at least two clients. One or more potential social network circuits may be tracked in real time or substantially in real time (i.e. in real time allowing for network delays).

The method may further include defining one or more active social network circuits based on one or more potential social network circuits. Such circuits may be defined based on at least one parameter defined by at least one client in the potential social network circuit. The clients in the active social network circuit may comprise all of the clients in a potential social network circuit or a subset of clients in a potential social network. The parameter(s) may be provided in a request defined by a requesting client in a potential social network circuit, for instance. Furthermore, the parameter(s) may be defined by one or more clients as preferences regarding desired social network circuit participants or conditions upon the client's participation in an active circuit, for example. Alternatively, an active social network circuit may be formed automatically, for example, by matching parameters of clients in a potential social network circuit.

Suitable parameters can include, but are not limited to one or more of the following, either alone or in combination: particular discussion or content-sharing topics, predetermined time periods of desired participation in active circuits, specified demographics or other user characteristics for circuit participants, specified content type or subject matter for file sharing, identification of particular clients for participation or exclusion, or social network parameters, such as maximum or minimum degrees of separation.

A social network circuit server can comprise one or more computing devices configured to access stored instructions that direct the computing device to perform activities, the activities including receiving session data from at least one social network circuit client application and tracking at least one potential social network circuit based on identifying at least one live communication link connecting a plurality of clients. The server may be further configured to provide identification identifying one or more potential social network circuits to at least one of the clients. The server may be further configured to access configuration parameters defined by at least one client and define a social network circuit based on such parameters.

Client applications may be implemented as computer software products. A computer software product may comprise a computer readable medium embodying executable instructions, the instructions directing a computing device to perform activities including generating session data identifying at least one live communication session between the computing device and at least one other computing device. The instructions may further direct the computing device to interface with a remote sever, provide session data to the remote server, and receive data identifying at least one social network circuit from the server. The instructions may further direct the computing device to display, based on the received data, a visual representation of at least part of at least one social network circuit in a human-readable form. For example, the instructions may direct the computing device to render a diagram of one or more potential and/or active social network circuits meeting certain parameters defined by the user interacting with the client application.

The instructions may direct the computing device to change the graphical representations of social network circuits and members of such circuits in any suitable fashion. For example, the computing device may be configured to graphically differentiate active social network circuit participants, potential social network circuit participants, and social network members from one another.

The software product may be configured as a stand-alone application including communication capabilities such as instant messaging, file sharing, and the like. Alternatively, the software product may be configured as a plug-in module or other element adapted to function with another application, such as an instant messaging client or content-sharing application.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 2A is a diagram depicting an exemplary social network and an exemplary social network circuit, while

Use of like reference numerals in different features is intended to illustrate like or analogous components.

DETAILED DESCRIPTION OF THE PREFERRED EMBODIMENTS

Figure 1:
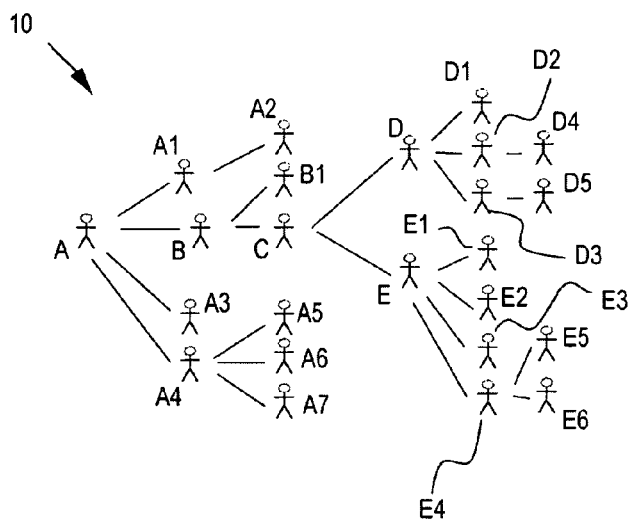
FIG. 1 is a diagram depicting an exemplary social network.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The instant disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein.

The present disclosure provides several examples of communication systems that include social network circuit functionality. For purposes of example only, the disclosure uses several examples involving an instant messaging (IM) system. However, one of ordinary skill in the art will understand that the principles and teachings contained herein are applicable not only to IM systems, but any other suitable network-based communication technology, including e-mail, web-based communications, file and content sharing, audio communications including cellular and VoIP telephony, and the like.

FIG. 1 illustrates an exemplary static social network 10 as shown from the point of view of user "A." Although the figures provided herein use a diagram form, it will be appreciated that social networks may be illustrated in many different ways. For example, a social network can be visualized as a circle, a tree or graph, a diagram, a node map with expandable/collapsible nodes, a table, etc.

One of skill in the art will note that user A's social network includes a plurality of members separated by varying degrees of separation from A. In this example, user B is separated from user A by a single degree of separation, user C is two degrees of separation from user A, and so on. Users D4, D5, E5, and E6 are the farthest-separated members of this particular social network, in this case being separated from user A by five degrees of separation.

As is also known to one of skill in the art, a social network such as social network 10 may be generated based on ascertaining a variety of links between the members. For example, social network 10 may be generated through lists of friends or contacts, such as would be provided to a social networking site. Network 10 may represent the end result of correlating e-mail or other contact information, such as a buddy or contact list in an instant messaging application.

For example, users A1, B, A3, and A4 may all be linked to user A on the basis of being entries in A's address book. Alternatively, users A1, B, A3, and A4 may be on a buddy or contact list in an instant messaging application utilized by A. Continuing with the latter example, users A5, A6, and A7 may be on user A4's buddy list, and so forth. One of skill in the art will recognize that the social network 10 may be generated based on a variety of different sources taken alone or in combination; for instance, some of the links between the users depicted in 10 may be based on address book entries, other links based on buddy lists, and still further links based on friend preferences provided by the users. Systems and methods for administering and using social network circuits as described herein may rely on any number and combination of underlying social networks. Data defining the underlying social network(s) may include data obtained from other, pre-existing social network representations. Alternatively or additionally, the underlying social network(s) may be defined from social network representations generated specifically as a basis for social network circuit participation.

As noted previously, however, a map, diagram or other representation of a static social network may be of limited use to user A. For instance, although A may be able to determine whether certain members in one or more social networks are online, A has no easy way of determining who is in actual communication with one another, the extent of such communication, or desired topics of communication.

Embodiments of the presently-disclosed systems and methods may be of value to users such as A. FIG. 2 illustrates social network 10 with an exemplary overlay depicting a social network circuit 12 that may be ascertained though use of the teachings contained herein. Exemplary social network circuit 12 includes users A, B, C, D, and E. As will be discussed herein, social network circuit 12 is tracked using one or more computing devices that receive session information identifying live communication links between the users in the circuit. Social network circuits such as 12 may be presented to one or more users in the circuit to assist the user(s) and enhance the overall online experience and communication capabilities of the user(s).

Social network circuits may be used by members thereof for a variety of different communication purposes, including content distribution, collaboration, gaming, messaging, and topic-based discussions. Social network circuits may be administered and used through use of a plurality of computing devices linked by network connections. As was noted above, any type or combination of types of network connections are suitable.

Figure 3:
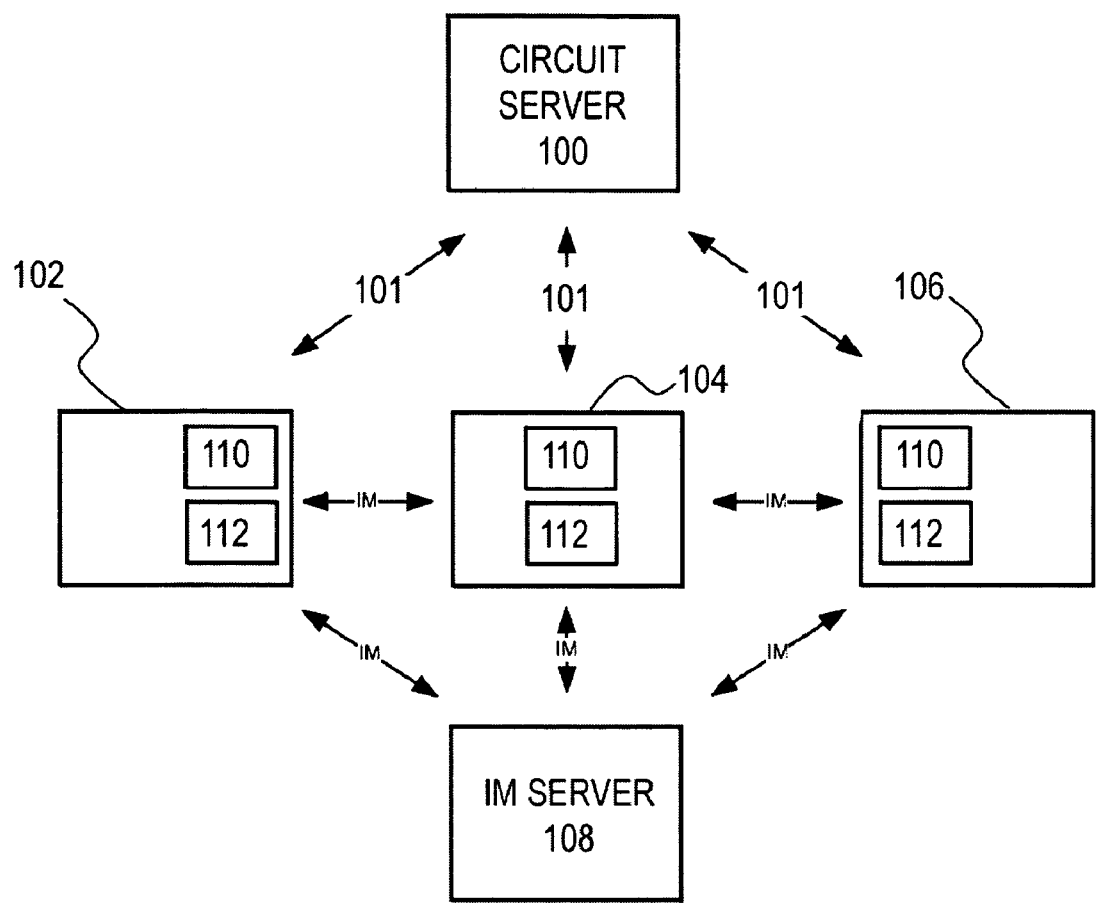
FIG. 3 is a functional block diagram depicting an exemplary arrangement of components in a communication system including social network circuit functionality.

FIG. 3 depicts a block diagram configuration of an exemplary social network circuit system as implemented alongside an instant messaging (IM) network. In FIG. 3, a social network circuit server 100 is shown in communication with a plurality of clients 102, 104, and 106. One of skill in the art will appreciate that embodiments of the technology disclosed herein could include more or fewer clients than the three illustrated in this particular example. Each client may comprise, for example, a user computing device such as a personal computer (PC), cellular telephone, or network-capable personal digital assistant (PDA). Each client 102, 104, and 106 include processing capability and has access to one or more forms of computer-readable storage. Each client 102, 104, and 106 is configured to use such processing capability and memory access to load and execute software including two software applications 110 and 112.

Software application 110 comprises a social network circuit client application, while software application 112 represents one or more communication applications. In this example, software application 112 is configured to send and receive instant messages between and among the clients, and in this example is further configured to interface with an IM server 108. For example, application 112 may comprise an IM application such as AOL Instant Messenger or Yahoo! Messenger.

Software application 110 is configured to provide social network circuit functionality to each client by interfacing with one or more social network servers such as social network server 100. Each instance of application 110 is configured to provide session data to server 100, the session data including information identifying one or more live communication links between the client and one or more other clients. For example, application 110 may monitor communications activities of one or more communications applications 112 and generate session data therefrom. Additionally or alternatively, application 110 may generate session data by monitoring other activities of the client, for example, by monitoring operating system activities, other applications, or network connections. Application 110 may also be further configured to provide the client with one or more depictions of active and potential social network circuits based on data received from server 100.

Server 100 is configured to receive session information from the clients 102, 104, and 106. Server 100 may be programmed to continuously track one or more social network circuits by determining which members of a social network are connected by live communication links based on session data received from the client applications 110. The server may maintain a record of all active, potential, and past social network circuits through use of one or more databases, and may further maintain records of user preferences and other configuration settings.

For example, when one client establishes a communication link to one or more other clients, at least one of the involved clients sends a message to server 100 including session information. For instance, the client application 110 may be configured so that session information is sent to server 100 after the client initiates communication with another client and receives some sort of positive response. The server 100 can store information identifying the session. When queried as to possible circuits involving a client, the server may build an n-level diagram based on live sessions. N may be a limit specified by the querying client. The server may be further configured to observe an upper limit to n based on resource considerations.

Although depicted as a single server in FIG. 3, the social network circuit server 100 may be implemented as more or fewer physical or logical units. For example, the functionality provided by server 100 may be distributed across a plurality of networked servers or even to supernodes within the social network. Social network server 100 may be implemented as a modular component or process in a larger system, for example, as a component in an instant messaging system or social network site. Application 110 may be configured to contact server 100 on a continuous or intermittent basis and may provide session data including more detail than simply identification of communication links. For example, session data can include updates as to progress and status of previously-identified communication links. Similarly, social network circuit server 100 may be configured to track social network circuits continuously, in real-time or near-real-time, or at regular or irregular intervals. In some embodiments, social network circuit server 100 may be configured to actively query client applications for session and other data.

The system may be configured so that an active social network circuit is not created until one or more users explicitly request creation of a circuit. Alternatively, the system may be configured to automatically create active circuits based on one or more parameters.

In the example of FIG. 3, application 110 comprises a plug-in to the instant messaging application. One of skill in the art will appreciate, however, that application 110 may be implemented as a standalone program with communications capability. In such an example, no separate communication application 112 or related server 108 would be used. Furthermore, depending upon the particular communications context, communication application 112 may connect to more or fewer servers. For example, assuming communication application 112 comprises a peer-to-peer content sharing application, no connection to a central communication server 108 is necessary. However, if one or more central communication servers such as server 108 are utilized by application 112, such server(s) may be utilized by social network circuit server 100 as a source of session data.

One of skill in the art will appreciate that application 110 need not be limited to tracking communications links between a user via a single application or medium. Instead, the system may be configured to monitor address situations in which a particular social network member may be connected to several members of a social network by disparate means.

For example, a multi-tasking user M may be linked to one member of a social network by an instant messaging connection while engaging in file-sharing with a second member of the social network. Application 110 may be configured to provide session information about both connections to server 100. Taking the example further, the user may be further connected to a third member of the social network by a VoIP telephone link, with the link also monitored by application 110.

Multiple instances of application 110 may correspond to the same user. Taking the example of multi-tasking user M, assume that, rather than using a VoIP telephone link, M is in contact with the third member of the social network by a cellular telephone link. In that case, one or more instances of application 110 would provide session data regarding the instant messaging and file-sharing links while a separate instance of application 110 associated with the cellular connection (such as running on the cellular telephone or at the cellular telephone provider) would provide session data regarding the cellular connection.

Figure 2A:
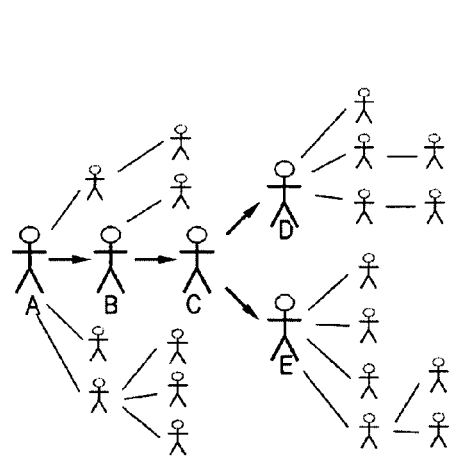
Figure 2B:
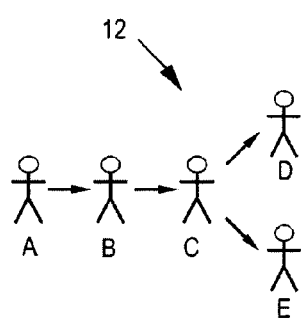
FIG. 2B illustrates the exemplary social network circuit alone.

An example of the operation of a social network circuit administration system will now be discussed in the context of an IM conference amongst members of social network 10 as shown in FIGS. 1, 2A, and 2B using a system such as is illustrated in FIG. 3. For purposes of this example, it is assumed that each user is operating a computing device such as 102, 104, or 106 executing an instant messaging application 112 interoperating with a social network circuit client application 110.

Assume user A goes online to talk to one or more contacts, and begins by messaging user B. Client application 110 sends session information to server 100 indicating that A and B are communicating using IM. Server 100 generates a record indicating that one potential circuit (A→B) exists. Some time later, while B and A are still in contact, user C messages with user D. Client application 110 running on user C's machine sends session information to server 100, which generates another record, with server 100 indicating existence of two potential circuits (A→B) and (C→D).

Assume further that, while the above messaging is occurring, user C also messages with user E. C's machine sends session information to server 100, which then modifies its records to show two potential circuits (A→B) and (C→(D and E)). Depending upon the particular programming of server 100, the circuits may be rendered as (A→B), (C→D), and (C→E). Of course, one of ordinary skill in the art will appreciate that the particular data and logical format used by server 100 to track circuits is unimportant so long as server 100 is appropriately configured to accurately ascertain the nature and extent of the circuits.

Finally, while the above messaging is still occurring, user B sends a message to user C. User B's machine notifies server 100, which makes a note of the newest live session. Server 100 is further configured to recognize that, among the four sessions, one potential social network circuit (depicted at 12 in FIG. 2) including users A through E now exists (A→B→C→(D and E)). Therefore, server 100 updates its records to reflect the single potential social network circuit.

During the various messaging sessions, server 100 may also provide information regarding the potential social network circuits to the various participating clients. For example, server 100 may be configured to provide structured information in a format such as an XML file to each client indicating social network circuits which the client may participate in. For instance, the structured information may be provided to each client after session data about the client has been received. Alternatively, server 100 may provide the structured information to each client at regular or irregular intervals or in real time.

Data indicating potential social network circuits may be provided to users in any suitable fashion based on data received from server 100. For example, client application 110 may be configured to render a diagram depicting one or more social network circuits as an overlay on a social network, such as is depicted in FIG. 2. FIG. 2 illustrates a potential social network circuit 12 corresponding to the above-discussed (A→B→C→(D and E)) circuit as an overlay on social network 10. Users may thereby visually determine which members of a social network are in active communication. In this example, icons representing users in the potential social network circuit are rendered larger than non-members, and members are linked by arrows rather than dashed lines. Although unidirectional arrows are shown, one of skill in the art will appreciate that the links are actually bidirectional.

Figure 4:
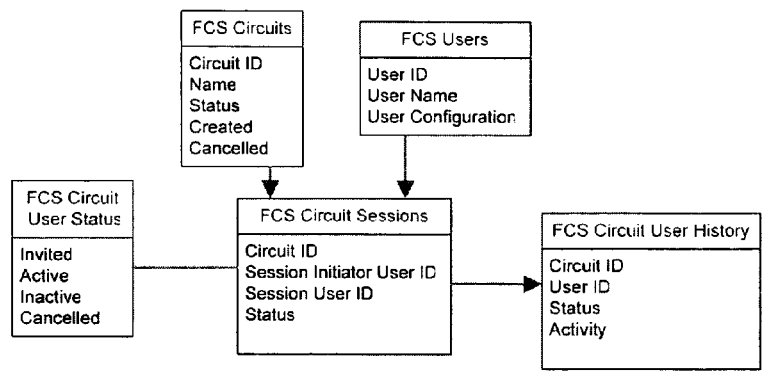
FIG. 4 is an illustration of an exemplary database layout scheme for use in a communication system including social network circuit functionality.

As one of skill in the art will appreciate, server 100 may comprise any suitable computing device or devices appropriately configured to obtain session data and track social network circuits. For example, a social network circuit system may track social network circuits using one or more database structures as shown in FIG. 4. For instance, a record may be maintained for each social network circuit based on a unique identifier, the record further including a name for the circuit, status, a set of users, status for those users, and an audit trail of activity on the circuit.

The exemplary database structures shown in FIG. 4 may be used to track and maintain records of potential and active social network circuits. For example, a record may be maintained for all users that includes a user ID, user name, and configuration parameters. The database may maintain a record for each circuit, the record including a circuit ID, name, status, date of creation, and date of cancellation. Each session of a circuit may also be tracked in a record, the record including circuit ID, session initiator user ID, user IDs for the session, and the status of the session. A record for the status of each circuit user may be maintained, noting, for example, whether the user is invited, active, inactive, or cancelled. The database may further include history records tracking individual users, circuits, status, and history. For example, the history may include times of activity and inactivity, content or other information about the substance of activity, and the like.

For example, if users A, B, C, D, and E had previously participated in a social network circuit, the server 100 may annotate a record corresponding to the previous record rather than declare the existence of a new circuit. Data included in the audit trail may be used to provide additional features and options to the members of the circuit or enhance the efficiency and functionality of the system The system may manage the status of a particular circuit or sub-circuit in a number of ways. For example, as noted above, "potential" social network circuits may include any members linked to the circuit by at least one live communications link. "Active" circuits may be designated based on matching members to one or more parameters that may be member-defined or system-defined (or both). When an active circuit is first created, all members may be added to the circuit with a status as "invited." Each user may then choose to participate in the circuit by accepting or declining the invitation. Users not participating in an active circuit may still receive indicators showing the existence of the circuit, and may optionally later enter a pre-existing circuit by making a request using client application 110.

The request may be directed to server 100 and/or to the other client applications 110 depending upon the setup of the system and/or the particular circuit. For example, the system may be configured so that server 100 adds a new member to a circuit only upon confirmation by one or more members of the circuit. The request may be directed to a designated moderator, for example, or may be forwarded from the requesting member to the moderator by way of server 100. In other embodiments, addition to a circuit may first require confirmation by all currently-listed members of said circuit. In such a case, application 110 may be configured to obtain permissions form the other client applications 110 and provide such permissions to server 100. Alternatively, of course, server 100 may query each client application 110 corresponding to the currently-listed members.

Server 100 may indicate a circuit as "active" until the initiator of the circuit terminates the circuit (or other users terminate the circuit, provided such users have permission to do so). Server 100 may be configured to terminate a circuit after the number of participants falls below a predetermined level. For example, a circuit may persist until one of the last two participating members exits. Of course, one of skill in the art will recognize that "terminating" a circuit refers to terminating an active social network circuit. Server 100 will continue to track one or more potential social network circuits so long as there remain social network members connected by one or more live communication links.

As was noted above, social network circuits are defined on the basis of live communication links between users. However, in some embodiments, it may be advantageous to utilize a delay option. When a delay option is used, "live" communication links are deemed to include both links over which communication is actually occurring and links over which communication has occurred within a predetermined time window.

Using the example above, assume that users C and D ended their IM session just prior to B and C initiating theirs. If a delay option was not used, user D would not be included in the social network circuit even if user D were still online and willing to participate in further discussions, for example, with user A. This would be because, in this example, without the active (C→D) link, there is no other path between users A and D.

However, if the definition of the circuit includes a delay option, the outcome would differ. For example, including a delay option allowing for a link to be active up to 60 seconds after the last communication could allow user D to remain in the potential circuit (C→(D and E)) long enough to observe the inclusion of A and B into the circuit via B's message to C.

The delay functionality may be implemented using any suitable technique. For instance, server 100 may be configured to identify a session as "active" for a default time period after receipt of session information from a client. In alternative embodiments, the session information sent to server 100 may include a time-out value different from the default value and set by the user by way of the client application. For example, client application 110 may include a configuration preference allowing users such as D to specify a length of time over which their status as "active" would persist for social network circuit formation. The preference could be tailored for specific users, times, circuits, and other degrees of granularity. Delay periods may be varied based on other parameters. For example, the delay period may be a function of the session type, the underlying network connection, the extent or volume of communication sent during the session, or other parameters. Certain of the parameters could be set at the server level, while others could be set at the client level.

In alternative embodiments, in addition to or instead of a delay option, it may be advantageous to utilize an advance option. When an advance option is used, "live" communication links are deemed to include certain links over which communication has not yet occurred. Users can provide a parameter to client application 110 indicating one or more time periods during which they wish one or more communication links to be "live." For example, if the users of social network circuit 12 wish to communicate every weekday at 2 PM, they can specify such a preference to client applications 110. Client application 110 may implement the advance option alone or in combination with server 100, such as by relaying the preference to server 100.

In any event, server 100 treats the respective links in the circuit as "live" at the designated time (i.e. 2 PM). Alternatively, server 100 may be configured to utilize audit trail and historical data to automatically schedule recurring social network circuits based on past times of interaction. The advance option could be combined with the delay option so that pre-scheduled links comprising a social network circuit become "live" at one or more predetermined times, but only remain "live" for a set time interval if further communications do not actually occur (i.e. users that decline to actively participate are ultimately dropped).

Figure 5:
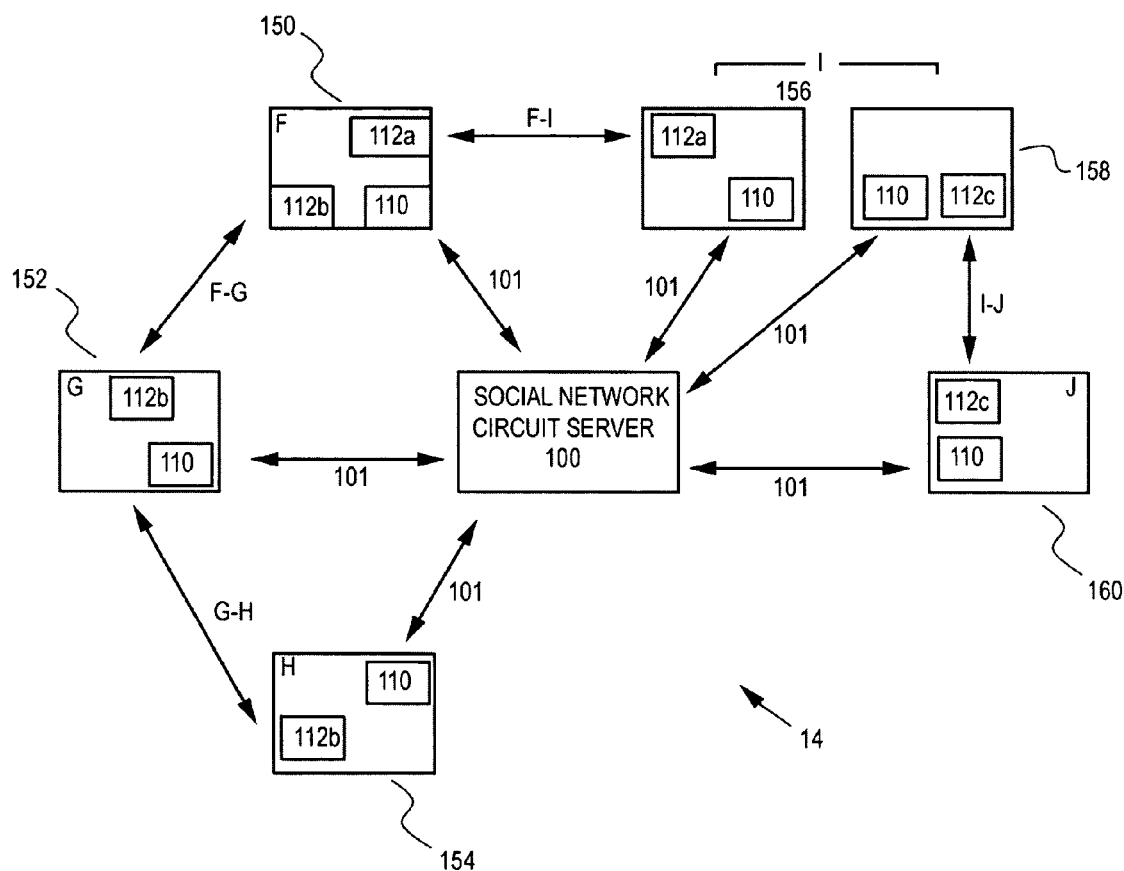
FIG. 5 is a functional block diagram depicting an exemplary arrangement of components in a communication system including social network circuit functionality.

FIG. 5 depicts a block diagram of computing devices and software components used to form another exemplary social network circuit. FIG. 5 depicts five users (F, G, H, I, and J) using various computing devices linked to one another and to a social network server 100. For ease of reference, in this example, users F through J will be referred to as members of social network circuit 14. For example, users F through J could be linked to the same social network server 100 as discussed above in conjunction with users A-E, but would not be included in social network circuit 12 since there is no live communication link between any of the members of social network circuit 12 and any of users F through J. If, for example, one or more live communication links were initiated between one or more members of circuits 12 and 14, the circuits could be merged into a single social network circuit. One of skill in the art will appreciate, however, that for various reasons, social network circuit 14 could alternatively operate based on a separate social network server.

In this example, F is using computing device 150, G is using computing device 152, and H is using computing device 154 which may all comprise, for instance, laptop computers. User I is using two different devices 156 and 158. Device 156 may comprise a PDA, while device 158 comprises, for instance, a voice over internet protocol (VoIP) telephone set, for example. Finally, in this example, user J is using a desktop computer 160.

As shown in FIG. 5, the several devices are also running various distinct communications programs. In this case, devices 150 and 156 are running a file-sharing application 112*a*; devices 152 and 154 are running instant messaging program 112*b*; while devices 158 and 160 are running application 112*c* providing VoIP functionality. It will be apparent to one of ordinary skill in the art that this particular social network circuit is heterogeneous—that is, its members are linked by several types of communication links, rather than the IM-only example discussed above regarding users A through E. Of course, there could be further variance in the type and nature of the communications applications, such as different version/revisions, different operating systems, etc.

Each of the several devices is also running an instance of social network circuits client application 110. Each instance monitors communication links between each user and provides session data over connection 101 to social network circuit server 100. For example, the instance of application 110 running on machine 150 monitors both the P2P (or other) file sharing communication link F-I and IM communication link F-G, while the other instances of 110 each monitor a single connection in this example. Session data regarding user I may be reported by two instances of application 110, with one instance providing session data regarding P2P connection F-I via device 156 and another instance of application 110 providing session data regarding VoIP connection I-J via machine 158. Each instance of application 110 may be configured to interface with the various communications applications 112 in any suitable manner in order to generate session data regarding the communication links. Furthermore, as noted above, application 110 may generate some or all session data by accessing other resources and processes running on each computing device, for example, information available from the device's operating system and network connection status indicators.

For ease of reference, connections between the various communications applications 112 and any communication-application specific servers (if any) are not shown in FIG. 5. For example, instant messaging application 112*b* may utilize a central server such as IM server 108 in the example discussed above in conjunction with FIG. 3. Applications 112*a* and 112*c* may utilize one or more servers, as well. In any event, however, any use of centralized (or other) servers by the communication applications 112 is not essential to the present subject matter. However, for those communication applications 112 which do connect to a centralized or other server, the client-server connection(s) may be used by application 110 in generating session data.

Connections 101 may further be used by each client application 110 to receive social network circuit data for applications 110 to utilize in rendering social network circuit diagrams and other representations to users F through J. For example, although all users are not linked via the same type of connections, application 110 nonetheless will indicate to each that potential social network circuit 14 including users F through J is available. Thereafter, an interested user or users could then request the creation of one or more active social network circuits based on potential social network circuit 14.

For example, a user may request that an active circuit be created based on a communication type preference parameter, such as an active circuit using IM communications. Initially, the active IM circuit would include users F, G, and H. However users I and J could be given notification through application 110 that the IM circuit is available and could activate corresponding versions of IM application 112*b*. Alternatively, the active social network circuit could be created based on any number of other parameters discussed herein.

As was noted above, a particular group of social network members may give rise to any number and combination of social network circuits. Various "active" social network circuits may be defined based on matching configuration and preference settings provided by users to create user-tailored circuits. For example, client application 110 may provide for configuration and preference settings for users to define the extent and nature of their participation in social network circuits. Such preferences may be stored locally and accessed by client application 110 in providing functionality at the client machine. As an example, each user may specify that client application 110 is only to display social network circuits with users matching certain parameters. Preferences may alternatively or additionally be relayed to the social network circuit server 100 for circuit definition, tracking, and other purposes.

Such parameters may include, but are not limited to, one or more of the following, either alone or in combination: particular discussion or content-sharing topics, predetermined time periods or times of day of desired participation in active circuits, specified demographics or other user characteristics for circuit participants, specified content type or subject matter for file sharing, identification of particular clients for participation or exclusion, or social network parameters including maximum or minimum degrees of separation or user trust levels. The parameters may include simple on/off functionality for circuit participation as well.

Returning to the example using FIGS. 1-3, assume that application 110 and server 100 are configured to allow users of the system to designate preferred types of circuits in which they prefer to participate. For this example, further assume that the members A, C, and E all indicate that they wish to participate in circuits devoted to discussion and sharing of certain types of content such as "comedy video." The users proceed as set forth in the previous example to contact one another and social network circuit 12 is tracked by server 100.

Based on the preference information provided by members A, C, and E, server 100 may recognize that all three of said users wish to participate in a circuit devoted to "comedy video." Server 100 may automatically designate an active social network circuit including users A, C, and E. The circuit may provisionally designate A, C, and E as users pending confirmation of participation (e.g., by accepting an invitation generated by server 100).

Alternatively, server 100 may be queried by one or more client applications executed by A, C, and E for information about users for a "comedy video" circuit. The query may be the result of a request generated by users A, C, or E and sent using client application 110. As an alternative, the request may be automatically generated by the client application 110 based on configuration settings. For instance, user A may be interested in comedy videos and discussions of political humor. A's instance of application 110 may query server 100 for potential circuits including users matching the "comedy video" parameter or the "political humor" parameter. In the case of "comedy video," server 100 would return data indicating that users C and E are members of a potential social network circuit including A who are interested in "comedy video."

Based on the returned data, any or all of users A, C, and E could request creation of an active social network circuit devoted to "comedy video." Server 100 could be configured to verify that such a circuit does not already exist and, if so, provide the requesting user(s) with the option of joining the pre-existing circuit. If a "comedy video" circuit previously existed but was terminated (i.e. a prior session ended), the requesting user(s) could be provided the option of reviving the previous circuit.

As noted above, client application 110 may be configured to provide user A with a diagram of one or more social networks with one or more potential social network circuits overlaid thereon. Furthermore, sub-circuits and/or active circuits can be depicted as further overlays or alterations to the diagram. Additionally, application 110 may include support for display preferences in order to generate views of social network circuits and/or members therein based on matching certain parameters. For instance, users may filter views of potential and/or active social network circuits and sub-circuits based on configuration parameters and the display preferences.

Figure 6A:
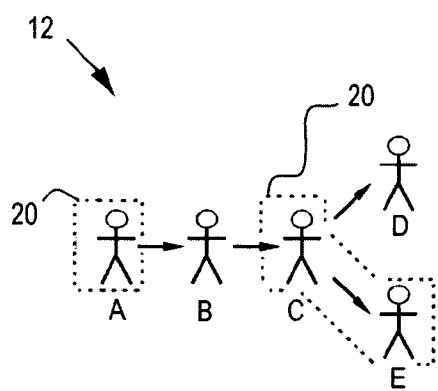
FIGS. 6A through 6D are illustrations of exemplary active social network circuits which may be utilized based on the potential social network circuit shown in FIGS. 2A and 2B, with FIG. 6A showing a first active social network circuit as an overlay on the potential social network circuit, FIG. 6B depicting the first active social network circuit alone, FIG. 6C illustrating a second active social network circuit as an overlay on the potential social network circuit, and FIG. 6D depicting the second active social network circuit alone.
Figure 6B:
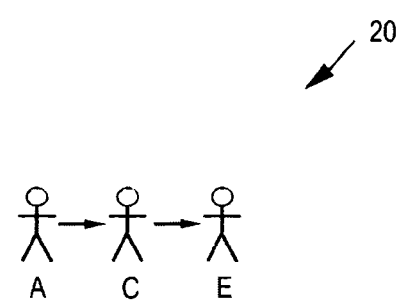

Using the example from above, user A may configure application 110 to display existing social network circuits related to "comedy video." Users A, C, and E may be highlighted in active social network circuit 20 as is depicted in FIG. 6A, with user B (uninterested in comedy video) grayed out. Alternatively, as illustrated in FIG. 6B, the display may show only members in the active social network circuit 20 who meet the criteria. Furthermore, the display may be configured to have highlighted users A, C, and E as interested in "comedy video" prior to the creation of active social network circuit 20.

Figure 6C:
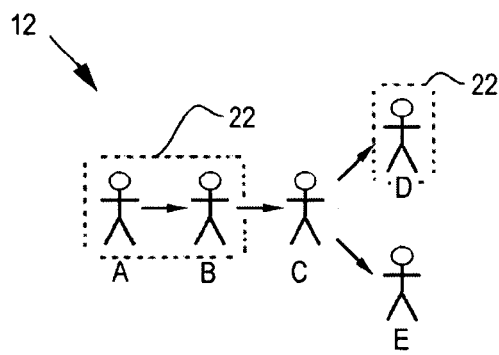
Figure 6D:
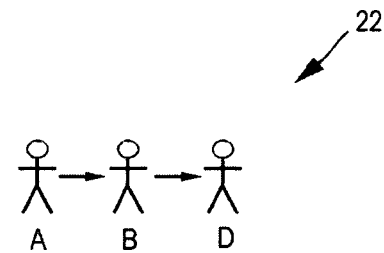

As was noted above, a particular user may participate in any number of potential and/or active social network circuits. FIGS. 6C and 6D illustrate another social network circuit 22 in which user A may participate. For example, assuming that users B and D (but not C and E) were interested in joining a social network circuit related to "political humor," server 100 could create (or such users could request creation of) active social network circuit 22. FIG. 6C shows circuit 22 overlain on potential social network circuit 12, while FIG. 6D illustrates a simplified view of circuit 22 alone.

Client application 110 could be configured for a variety of possible display options for various active and potential social network circuits, such as providing the overlays and simplifications of social network diagrams such as those shown in FIGS. 2A-2B and FIGS. 6A-6D to differentiate active social network participants, potential social network circuit participants, and other members of a social network from one another.

Various combinations and alternatives for displaying potential social network circuits, active social network circuits, and sub-circuits will be apparent to one of ordinary skill in the art. For example, members of a particular social network circuit or sub-circuit may be differentiated based on highlighting, changes in icon shape, size, form, or color, changes in the link or links illustrated between the members, animation, textual or visual annotations or animations, and the like.

For example, client application 110 may render, for members of potential social network circuit 12, a diagram of social network 10 in which members of the potential social network circuit are connected by glowing arrows. Users interested in a particular topic may be denoted by an icon and/or text. For instance, users interested in "comedy video" (i.e. A, C, and E) may be annotated by a comedic icon. Alternatively, selection of a particular parameter may gray out or erase non-matching users from the display.

As was noted above, the social network circuit server 100 may include an audit trail tracking participation in social network circuits. Data pertaining to social network circuit use may be provided to client application 110 and rendered for display to users. For instance, a user may track the user's history of participation in particular social network circuits and/or the history of his friends or other social network members. User demographic and circuit use data may also be of interest to outside parties, such as social network providers, content providers, and marketers, and so may be packaged and provided to such outside parties.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A method for forming a social network circuit comprising:
    receiving, by a first server, first session data identifying a first active communication session between a first device and a second device, wherein the first active communication session has a first finite duration and enables real-time communications between a first user of the first device and a second user of the second device during the first finite duration;
    receiving, by the first server, second session data identifying a second active communication session between the second device and a third device, wherein the second active communication session has a second finite duration and enables real-time communications between the second user and a third user of the third device during the second finite duration;
    receiving, from the first device, a request to identify any potential social network circuits in which the first device may participate;
    in response to the request, providing, by the first server, a message to the first device identifying the second active communication session;
    receiving, by the first server, a request from the first device to form a first social network circuit comprising the first active communication session and the second active communication session;
    providing to the second device and the third device a message requesting permission to form the first social network circuit;
    receiving approval to form the first social network circuit from the second device and the third device; and
    forming, by the first server, the first social network circuit wherein a communication by any of the first device, the second device, and the third device are provided real-time to each of the others of the first device, the second device and the third device.

2. The method of claim 1 further comprising receiving a message from the first device and providing the message to the second device and the third device.

3. The method of claim 1 wherein the first active communication session and the second active communication session each comprise an instant messaging (IM) communication session.

4. The method of claim 1 further comprising receiving a file from the first device, and transmitting the file to the second device and the third device via the first social network circuit.

5. A computer server comprising:

a network interface adapted to communicate with a network;

a processor coupled to the network interface and adapted to:

receive first session data identifying a first active communication session between a first device and a second device, wherein the first active communication session has a first finite duration and enables real-time communications between a first user of the first device and a second user of the second device during the first finite duration;

receive second session data identifying a second active communication session between the second device and a third device, wherein the second active communication session has a second finite duration and enables real-time communications between the second user and a third user of the third device during the second finite duration;

receive, from the first device, a request to identify any potential social network circuits in which the first device may participate;

in response to the request, provide a message to the first device identifying the second active communication session;

receive a request from the first device to form a first social network circuit comprising the first active communication session and the second active communication session;

provide to the second device and the third device a message requesting permission to form the first social network circuit;

receive approval to form the first social network circuit from the second device and the third device; and form the first social network circuit wherein a communication by any of the first device, the second device, and the third device are provided real-time to each of the others of the first device, the second device and the third device.

6. The computer server of claim 5 wherein the processor is further adapted to receive a message from the first device and provide the message to the second device and the third device.

7. The computer server of claim 5 wherein the first active communication session and the second active communication session each comprise an instant messaging (IM) communication session.

8. The computer server of claim 5 wherein the processor is further adapted to receive a file from the first device, and transmit the file to the second device and the third device via the first social network circuit.

9. A computer program product, comprising a non-transitory computer usable storage medium having a computer readable program code embodied therein, the computer readable program code adapted to be executed on a processor to implement a method comprising:

receiving first session data identifying a first active communication session between a first device and a second device, wherein the first active communication session has a first finite duration and enables real-time communications between a first user of the first device and a second user of the second device during the first finite duration;

receiving second session data identifying a second active communication session between the second device and a third device, wherein the second active communication session has a second finite duration and enables real-time communications between the second user and a third user of the third device during the second finite duration;

receiving, from the first device, a request to identify any potential social network circuits in which the first device may participate;

in response to the request, providing a message to the first device identifying the second active communication session;

receiving a request from the first device to form a first social network circuit comprising the first active communication session and the second active communication session;

providing to the second device and the third device a message requesting permission to form the first social network circuit;

receiving approval to form the first social network circuit from the second device and the third device; and forming the first social network circuit wherein a communication by any of the first device, the second device, and the third device are provided real-time to each of the others of the first device, the second device and the third device.

10. The computer program product of claim 9 wherein the method further comprises receiving a message from the first device and providing the message to the second device and the third device.

11. The computer program product of claim 9 wherein the first active communication session and the second active communication session each comprise an instant messaging (IM) communication session.

12. The computer program product of claim 9 wherein the method further comprises receiving a file from the first device, and transmitting the file to the second device and the third device via the first social network circuit.

* * * * *